United States Patent [19]

Stegman et al.

[11] Patent Number: 5,418,126
[45] Date of Patent: May 23, 1995

[54] FURAN OR PYRROLE SUBSTITUTED DYE COMPOUNDS AND SILVER HALIDE PHOTOGRAPHIC ELEMENTS CONTAINING SUCH DYES

[75] Inventors: David A. Stegman, Churchville; Richard L. Parton, Webster; Steven G. Link, Rochester; Pamela M. Ferguson, Farmington, all of N.Y.

[73] Assignee: Eastman Kodak Company, Rochester, N.Y.

[21] Appl. No.: 183,454

[22] Filed: Jan. 19, 1994

Related U.S. Application Data

[63] Continuation of Ser. No. 978,568, Nov. 19, 1992, abandoned.

[51] Int. Cl.$^6$ ............ G03C 1/16; G03C 1/18; G03C 1/20
[52] U.S. Cl. ............ 430/582; 430/567; 430/583; 430/584; 430/586; 430/587; 430/588
[58] Field of Search ............ 430/567, 582, 583, 584, 430/586, 588, 587

[56] References Cited

U.S. PATENT DOCUMENTS

| | | | |
|---|---|---|---|
| 3,541,089 | 11/1970 | Heseltine et al. | 430/587 |
| 3,560,208 | 2/1971 | Fumia, Jr. et al. | 96/1.6 |
| 3,592,653 | 7/1971 | Fumia, Jr. et al. | 96/101 |
| 3,598,603 | 8/1971 | Chapman | 96/130 |
| 3,615,609 | 10/1971 | Ficken et al. | 96/104 |
| 3,632,349 | 1/1972 | Shiba et al. | 96/123 |
| 3,660,085 | 5/1972 | Depoorter et al. | 96/1.7 |
| 3,764,338 | 10/1973 | Depoorter et al. | 96/101 |
| 3,836,370 | 9/1974 | Beretta et al. | 96/127 |
| 4,119,466 | 10/1978 | Van Allan et al. | 96/115 |
| 4,434,226 | 2/1984 | Wilgus et al. | 430/567 |
| 4,657,846 | 4/1987 | Kokubo et al. | 430/434 |
| 4,800,154 | 1/1989 | Okazaki et al. | 430/570 |
| 4,921,781 | 5/1990 | Takamuki et al. | 430/496 |
| 4,925,780 | 5/1990 | Yoshizawa et al. | 430/589 |
| 5,006,455 | 4/1991 | Patzold et al. | 430/571 |
| 5,135,845 | 8/1992 | MacIntyre et al. | 430/585 |

FOREIGN PATENT DOCUMENTS

| | | |
|---|---|---|
| 0317886 | 11/1988 | European Pat. Off. |
| 0358187 | 9/1989 | European Pat. Off. |
| 1480882 | 5/1966 | France |
| 1063028 | 8/1959 | Germany |
| 1454644 | 11/1976 | United Kingdom |

OTHER PUBLICATIONS

Translation of German Patent 1,063,028 to Bach.
Translation of French Patent 1,480,882 to Gandino et al.

*Primary Examiner*—Janet C. Baxter
*Attorney, Agent, or Firm*—Gordon M. Stewart

[57] ABSTRACT

Spectral sensitizing dyes, and silver halide photographic elements incorporating them, which dyes have the formula:

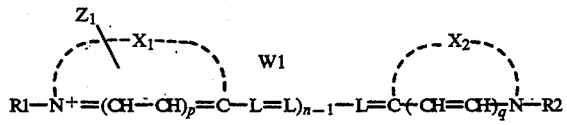

wherein:
X1 and X2 each independently represent the atoms necessary to complete a 5- or 6-membered heterocyclic nucleus (preferably benzo-condensed), and X1 may be further substituted and X2 substituted or unsubstituted;
n is a positive integer from 1 to 4,
p and q each independently represents 0 or 1,
each L independently represents a substituted or unsubstituted methine group,
R1 and R2 each independently represents substituted or unsubstituted aryl or substituted or unsubstituted alkyl,
Z1 represents a substituted or unsubstituted pyrrole or furan containing group;
W1 is a counterion as needed to balance the charge of the molecule.

24 Claims, No Drawings

FURAN OR PYRROLE SUBSTITUTED DYE COMPOUNDS AND SILVER HALIDE PHOTOGRAPHIC ELEMENTS CONTAINING SUCH DYES

This is a Continuation of application Ser. No. 978,568, filed 19 Nov. 1992, now abandoned.

FIELD OF THE INVENTION

This invention relates to dyes and silver photographic elements containing such dyes as sensitizing dyes.

BACKGROUND OF THE INVENTION

Silver halide photography usually involves the exposure of a silver halide photographic element with light in order to form a latent image that is developed during photographic processing to form a visible image. Silver halide is intrinsically sensitive only to light in the blue region of the spectrum. In order to sensitize the silver halide to other than the blue region, sensitizing dyes are used in the silver halide emulsion. Sensitizing dyes are chromophoric compounds (usually cyanine dye compounds). Their usual function is to adsorb to the silver halide and to absorb light (usually other than blue light) and transfer that energy via an electron to the silver halide grain thus rendering the silver halide sensitive to radiation of a wavelength other than the blue intrinsic sensitivity. However, sensitizing dyes can also be used to augment the sensitivity of silver halide in the blue region of the spectrum.

Generally a sensitizing dye should wash out of the film or paper during processing. Any retained dye contributes to Dmin and this is often referred to as sensitizing dye stain. Dye stain, which adversely affects the image recorded in the photographic material, has been a source of concern for many years. The problem of retained sensitizing dye stain has been aggravated by the advent of new emulsions, such as tabular grains, which have more surface area and use higher dye levels and accordingly tend to give higher levels of dye stain. Additionally, the use of high chloride emulsions makes preferable the use of sensitizing dyes having enhanced adsorption to silver halide since sensitizing dyes tend to be inherently less well adsorbed to silver chloride emulsions. This can also lead to higher levels of dye stain. Such high chloride emulsions are also often subjected to rapid processing, which can further aggravate dye stain problems.

In order to reduce dye stain, stain-reducing agents, such as bis-triazine stilbene compounds, also known as optical brighteners, have been used to reduce dye stain. These compounds, however, are expensive and can be difficult to incorporate in the hydrophilic layers of photographic materials. Another method for reducing dye stain in some cases, is to incorporate certain substituents into the dye molecule to reduce dye stain. For example, dyes containing N,N'-2-hydroxy-3-sulfopropyl nitrogen substituents (J. Gotze, et al., U.S. Pat. No. 3,424,586) are generally less retained than the corresponding dyes with 3-sulfopropyl groups. Other stain-reducing nitrogen substituents have also been disclosed such as the 2-sulfoethylcarbamoylmethyl groups disclosed in U.S. Pat. No. 5,091,298 to Parton et al.

Although the foregoing dye structure modifications can be effective at reducing dye stain they have not eliminated the problem. New substituents are always desirable which will result in dyes with low dye stain.

In addition, there is an important class of green sensitizers for which it is not possible to use these types of stain-reducing nitrogen substituents. In particular, benzoxazole dyes (an example is given in Formula A below) are commonly used to afford green sensitization in many photographic products such as color negative and reversal films, and color paper.

Formula A

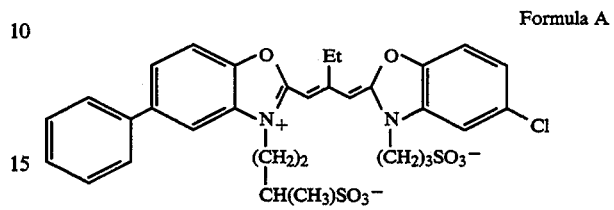

In many instances, benzoxazole dyes also produce undesirable post-process stain. However, it has not been possible to incorporate the aforementioned stain-reducing nitrogen substituents on these dyes because the benzoxazole nucleus is too reactive. For instance, attempts to place a 2-hydroxy-3-sulfopropyl substituent, a 2-sulfoethylcarbamoylmethyl or similar group on the benzoxazole nucleus result in ring-opening of the benzoxazole. Thus, alternative stain reducing substituents are especially needed for dyes containing the benzoxazole nucleus.

It is thus an object of this invention to provide new dye compounds useful as sensitizing dyes for silver halide photographic elements, which dyes have relatively low dye stain. It is a further object of this invention to provide new benzoxazole sensitizers which exhibit relatively low dye stain.

SUMMARY OF THE INVENTION

The present invention provides silver halide sensitizing dyes, and photographic elements containing such dyes, which have the structure:

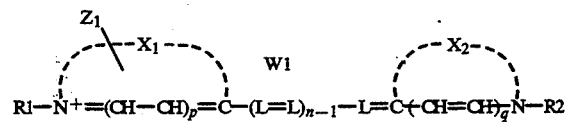

X1 and X2 each independently represent the atoms necessary to complete a 5- or 6-membered heterocyclic nucleus, and X1 may be further substituted and X2 substituted or unsubstituted;

n is a positive integer from 1 to 4, p and q each independently represents 0 or 1, each L independently represents a substituted or unsubstituted methine group, R1 and R2 each independently represents substituted or unsubstituted aryl or substituted or unsubstituted alkyl, Z1 represents a substituted or unsubstituted pyrrole or furan containing group;

W1 is a counterion as needed to balance the charge of the molecule.

EMBODIMENTS OF THE INVENTION

In the present application, the term "aromatic" refers to aromatic rings as described in J. March, *Advanced Organic Chemistry*, Chapter 2 (1985, publisher John Wiley & Sons, New York, N.Y.). Further, the term "lower alkyl" refers to an alkyl group containing from 1 to 6 carbon atoms.

In formula I, the 5- or 6-membered heterocyclic nucleus represented by X1 or X2 is preferably a benzocondensed nucleus. X1 and X2 may include a benzothiazole nucleus, benzoxazole nucleus, benzoselenazole nucleus, benzotellurazole nucleus, quinoline nucleus, benzimidazole nucleus, thiazoline nucleus, indoline nucleus, oxadiazole nucleus, thiadiazole nucleus, imidazole nucleus, napthothiazole, napthiazole, or napthotellurazole.

Z1 is preferably a substituted or unsubstituted pyrrole or furan, the ring of which is directly appended to the benzene ring of X1. However, when Z1 is a pyrrole or furan containing group generally, the pyrrole or furan ring may be linked to X1 through a linking chain of atoms which may be 4, 3, 2 or 1 atoms in length. However, any such chain and any substituents on Z1 should preferably maintain the relatively planar shape of the Z1-X1 group. Examples of Z1 include:

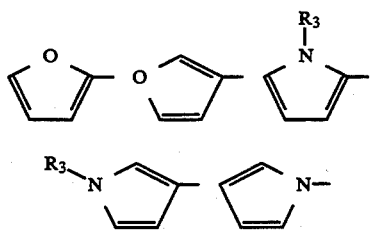

where R3 is hydrogen, substituted or unsubstituted alkyl (such as methyl or ethyl or 2-hydroxyethyl), or substituted or unsubstituted aryl (such as phenyl or 4-hydroxyphenyl). The above heterocyclic rings for Z1 are unsubstituted (that is, they are as shown). In another embodiment though, the above examples of Z1 may be substituted, for example with a 1 to 8 carbon alkyl (particularly methyl, ethyl, or propyl) or with a halogen (for example, F or Cl). Examples of W1 include sodium, potassium, triethylammonium, and the like.

The dyes of formula I of the present invention may, in particular, be of formula II or III below:

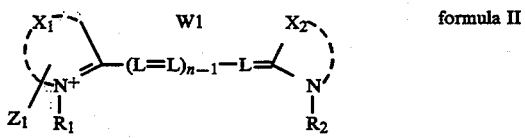

formula II

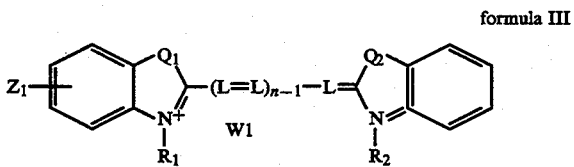

formula III

In formula II: X1 and X2 independently represent the atoms necessary to complete a benzothiazole nucleus, benzoxazole nucleus, benzoselenazole nucleus, benzotellurazole nucleus, quinoline nucleus or benzimidazole nucleus, and X1 may be further substituted and X2 substitued or unsubstituted; and Z1 is directly appended to the benzene or napthalene ring of X1. In formula III: Q1 and Q2 are each independently O, N, S or Se, or may even be Te. In either formula, R1, R2, n, Z1 and W1 are as defined in connection with formula I. Preferably, Z1 is a 5-position substituent, that is the structure would be:

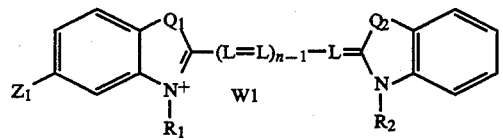

X1 and/or X2 or the benzene rings in any of formula I, II or III, may be substituted with substituents including halogen (for example, chloro, fluoro, bromo), alkoxy (for example, methoxy, ethoxy), substituted or unsubstituted alkyl (for example, methyl, trifluoromethyl), amides, alkoxycarbonyl, and other known substituents, and substituted and unsubstituted aryl (for example, phenyl, 5-chlorophenyl), thioalkyl (for example, methylthio or ethylthio), hydroxy or alkenyl and others known in the art. Examples of substituents for the methine groups, L, include alkyl (preferably of from 1 to 6 carbon atoms, e.g. methyl, ethyl, etc.) and aryl (e.g. phenyl). Additionally, substituents on the methine groups may form bridged linkages.

Although R1 and R2 in each of formula I, II or III can represent a substituted or unsubstituted aryl group, it is preferred that such an aryl group have between 6 to 15 C atoms. More preferably, R1 and R2 are alkyl groups (each preferably of from 1 to 6 carbon atoms). Examples of aryl include phenyl, tolyl, and the like. Examples of alkyl include methyl, ethyl, propyl, and the like, and substituted alkyl groups (preferably a substituted lower alkyl containing from 1 to 6 carbon atoms) such as hydroxyalkyl group (for example, 2-hydroxyethyl), a sulfoalkyl group, (for example, 4-sulfobutyl, 3-sulfopropyl) and the like. The alkyl or aryl group may be substituted by one or more of the substituents on the above-described nucelii, X1 and X2. In particular, R1 and R2 may be 2-sulfoethyl. When Z2 (see formula IV below) or any other substituent on X1 or X2 other than Z1, is an aromatic substituent that is commonly placed on sensitizing dyes, or Z2 is an unsubstituted furan or pyrrole nucleus, and n is equal to 1 or 2, it is preferred that R1 and R2 both be an acid or acid salt substituted alkyl, in particular, 2-sulfoethyl.

The dyes of formula I of the present invention may further be of the type of formula IV below:

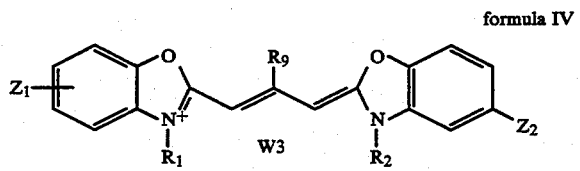

formula IV

In formula IV: R1 and R2 are lower alkyl (and may have from only 1 to 6 C atoms), at least one (and optionally, both) of which is substituted with an acid or acid salt group (for example, a sulfo group or —CH$_2$—CO—NH—SO$_2$—CH$_3$); R9 is a lower alkyl (for example, methyl or ethyl); Z2 is H, substituted or unsubstituted lower alkyl, substituted or unsubstituted alkenyl, halogen, or alkoxy; the benzene rings are unsubstituted except for Z1 and Z2; and W1 is as defined in connection with formula I. Again, Z1 is preferably in the 5-position, that is the strucure would be:

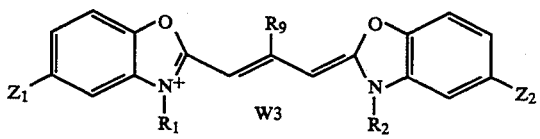

Particular examples of dyes of the present invention are listed below in Table 1:

TABLE I

| Dye | $Z_1$ | $Z_2$ | $R_1, R_2^a$ |
|---|---|---|---|
| I-1 | ⟨pyrrol-1-yl⟩ | Cl | SP, SP |
| I-2 | " | F | SP, SP |
| I-3 | ⟨pyrrol-2-yl, NH⟩ | Cl | SP, SP |
| I-4 | " | F | SP, SP |
| I-5 | ⟨furan-2-yl⟩ | Cl | SP, SP |
| I-6 | " | Cl | SP, SE |
| I-7 | " | F | SP, SP |
| I-8 | " | $= Z_1$ | SP, SP |

| Dye | $Z_1$ | $Z_2$ | $R_1, R_2^a$ |
|---|---|---|---|
| I-9 | ⟨pyrrol-1-yl⟩ | $= Z_1$ | SP, SP |
| I-10 | " | Cl | SP, SP |

| Dye | $Z_1$ | $Z_2$ | $R_1, R_2^a$ |
|---|---|---|---|
| I-11 | ⟨pyrrol-1-yl⟩ | Cl | SP, SP |

SE is 2-sulfoethyl, SP is 3-sulfopropyl.

Dye precursors can be made by techniques that are well-known in the art. For a review of the synthesis of substituted pyrroles see, G. P. Bean, *Pyrroles*, R. A. Jones, Ed., John Wiley & Sons, Inc., New York, 1990, Chapter 2. For a review of furan synthesis see, F. M. Dean, *Advances in Heterocyclic Chemistry*, A. R. Katritzky, Ed., vol .30, Academic Press, New York, 982, p 167.

For example, a pyrrol-1-yl substituted base can be made by reaction of an amino base with 2,5-dimethoxytetrahydrofuran.

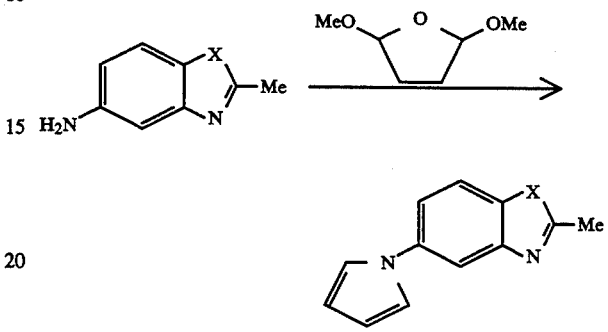

Preparation of a diazonium salt from an amino-substituted base followed by decomposition in the presence of furan results in formation of the furan-2-yl substituted base.

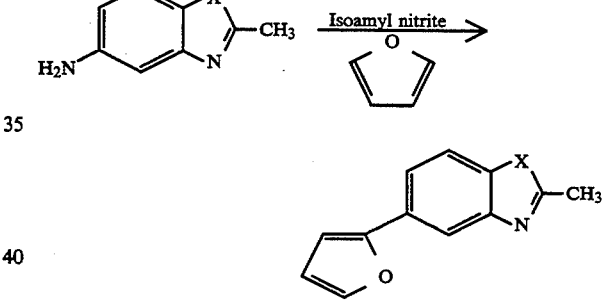

Dyes of the present invention can be prepared from the above dye precursors according to techniques that are well-known in the art, such as described in Hamer, *Cyanine Dyes and Related Compounds*, 1964 (publisher John Wiley & Sons, New York, N.Y.) and James, *The Theory of the Photographic Process* 4th edition, 1977 (Eastman Kodak Company, Rochester, N.Y.). The amount of sensitizing dye that is useful in the invention is preferably in the range of 0.1 to 4.0 millimoles per mole of silver halide and more preferably from 0.2 to 2.2 millimoles per mole of silver halide. Optimum dye concentrations can be determined by methods known in the art.

The silver halide used in the photographic elements of the present invention may be silver bromoiodide, silver bromide, silver chloride, silver chlorobromide, and the like. The silver halide used in the photographic elements of the present invention preferably contains at least 90% silver chloride or more (for example, at least 95%, 98%, 99% or 100% silver chloride). In particular, the possibility is also contemplated that the silver chloride could be treated with a bromide solution to increase its sensitivity, although the bulk concentration of bromide in the resulting emulsion will typically be no more than about 2 to 2.5% and preferably between about 0.6 to 1.2% (the remainder being silver chloride). The foregoing % figures are mole %.

The photographic elements of the present invention may particularly use the sensitizing dye with tabular grain emulsions. Tabular silver halide grains are grains having two substantially parallel crystal faces that are larger than any other surface on the grain. Tabular grain emulsions are those in which greater than 50 percent of the total projected area of the emulsion grains are accounted for by tabular grains having a thickness of less than 0.3 μm (0.5 μm for blue sensitive emulsion) and an average tabularity (T) of greater than 25 (preferably greater than 100), where the term "tabularity" is employed in its art recognized usage as $$T=ECD/t^2$$

where
  ECD is the average equivalent circular diameter of the tabular grains in μm and
  t is the average thickness in μm of the tabular grains.

The grain size of the silver halide may have any distribution known to be useful in photographic compositions, and may be ether polydipersed or monodispersed.

The silver halide grains to be used in the invention may be prepared according to methods known in the art, such as those described in *Research Disclosure*, (Kenneth Mason Publications Ltd, Emsworth, England) Item 308119, December, 1989 (hereinafter referred to as *Research Disclosure I*) and James, *The Theory of the Photoaraphic Process*. These include methods such as ammoniacal emulsion making, neutral or acid emulsion making, and others known in the art. These methods generally involve mixing a water soluble silver salt with a water soluble halide salt in the presence of a protective colloid, and controlling the temperature, pAg, pH values, etc, at suitable values during formation of the silver halide by precipitation.

The silver halide to be used in the invention may be advantageously subjected to chemical sensitization with compounds such as gold sensitizers (e.g., aurous sulfide) and others known in the art Compounds and techniques useful for chemical sensitization of silver halide are known in the art and described in *Research Disclosure I* and the references cited therein.

The photographic elements of the present invention, as is typical, provide the silver halide in the form of an emulsion. Photographic emulsions generally include a vehicle for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin, phthalated gelatin, and the like), and others as described in *Research Disclosure I*. Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, polyvinyl pyrrolidone, methacrylamide copolymers, and the like, as described in *Research Disclosure I*. The vehicle can be present in the emulsion in any amount useful in photographic emulsions. The emulsion can also include any of the addenda known to be useful in photographic emulsions. These include chemical sensitizers, such as active gelatin, sulfur, selenium, tellurium, gold, platinum, palladium, iridium, osmium, rhenium, phosphorous, or combinations thereof. Chemical sensitization is generally carried out at pAg levels of from 3 to 10, pH levels of from 5 to 8, and temperatures of from 30 to 80° C., as illustrated in *Research Disclosure*, June 1975, item 13452 and U.S. Pat. No. 3,772,031.

The silver halide may be sensitized by dyes of the present invention by any method known in the art, such as described in *Research Disclosure I*. The dye may be added to an emulsion of the silver halide grains in a suitable vehicle (for example, gelatin) at any time prior to (for exmple, during or after chemical sensitization) or simultaneous with the coating of the emulsion on a photographic element. The dye/silver halide emulsion may be mixed with a dispersion of color image-forming coupler immediately before coating or in advance of coating (for example, 2 hours). Essentially any type of emulsion (e.g., negative-working emulsions such as surface-sensitive emulsions of unfogged internal latent image-forming emulsions, direct-positive emulsions such as surface fogged emulsions, or others described in, for example, *Research Disclosure I*) may be used. The above-described sensitizing dyes can be used alone, or may be used in combination with other sensitizing dyes, e.g. to also provide the silver halide with sensitivity to wavelengths of light outside the green region or to supersensitize the silver halide.

Other addenda in the emulsion may include antifoggants, stabilizers, filter dyes, light absorbing or reflecting pigments, vehicle hardeners such as gelatin hardeners, coating aids, dye-forming couplers, and development modifiers such as development inhibitor releasing couplers, timed development inhibitor releasing couplers, ultraviolet absorbers, bleach accelerators, and the like. These addenda and methods of their inclusion in emulsion and other photographic layers are well-known in the art and are disclosed in *Research Disclosure I* and the references cited therein. Photographic elements of the present invention may have dye-forming couplers dispersed in a water-immiscible solvent (such as a color coupler solvent). The emulsion may also include brighteners, such as stilbene brighteners. Such brighteners are well-known in the art and are used to counteract dye stain, although-the dyes of the present invention generally have low dye stain even if no brightener is used.

The emulsion layer containing silver halide sensitized with a dye of the present invention can be coated simultaneously or sequentially with other emulsion layers, subbing layers, filter dye layers, interlayers, or overcoat layers, all of which may contain various addenda known to be included in photographic elements. These include antifoggants, oxidized developer scavengers, DIR couplers, antistatic agents, optical brighteners, light-absorbing or light-scattering pigments, ultraviolet absorbing stabilizers, and the like. The layers of the photographic element can be coated onto a support using techniques well-known in the art. These techniques include immersion or dip coating, roller coating, reverse roll coating, air knife coating, doctor blade coating, stretch-flow coating, and curtain coating, to name a few. The coated layers of the element may be chill-set or dried, or both. Drying may be accelerated by known techniques such as conduction, convection, radiation heating, or a combination thereof.

Photographic elements of the present invention can be black and white but are preferably color. A color photographic element generally contains three silver emulsion layers or sets of layers (each set of layers often consisting of emulsions of the same spectral sensitivity but different speed): a blue-sensitive layer having a yellow dye-forming color coupler associated therewith; a green-sensitive layer having a magenta dye-forming color coupler associated therewith; and a red-sensitive layer having a cyan dye-forming color coupler associated therewith. Those dye forming couplers are provided in the emulsion typically by first dissolving or dispersing them in a water immiscible, high boiling point organic solvent, the resulting mixture then being dispersed in the emulsion. Suitable solvents include those in European Patent Application 87119271.2. Dye-forming couplers are well-known in the art and are disclosed, for example, in *Research Disclosure I*.

Photographic elements comprising the composition of the invention can be processed in any of a number of well-known photographic processes utilizing any of a number of well-known processing compositions, described, for example, in *Research Disclosure I*, or in James, *The Theory of the Photographic Process* 4th, 1977. Such processing further includes rapid processing of the type described in, for example, U.S. Pat. No. 4,892,804.

The invention is further described in the following Examples.

Synthesis Example 1—Synthesis of Dye I-1.

Intermediate A; 5-(pyrrol-1yl)-2-methylbenzoxazole:

5-Amino-2-methylbenzoxazole (30.0 g, 0.203 mol) and 2,5-dimethoxytetrahydrofuran (30.0 g, 0.227 mol) were combined with 90 mL of acetic acid and the solution was heated at reflux for 1 hr. The mixture was evaporated to a red slurry and mixed with hexane to give a dark solid. The solid was dissolved in methylene chloride and extracted with basic water. The organic phase was removed, dried, and evaporated to a brown solid. Recrystallization from hexane/heptane afforded 18 g (45 % yield) of product, m.p. 115°–121 C.

Anal. Calcd for $C_{12}H_{10}N_2O$: C, 72.72; H, 5.08; N, 14.13. Found: C, 72.51; H, 4.97; N, 14.03.

Intermediate B: Anhydro-5-(pyrrol-1-yl)-2-methyl-3-(3-sulfopropyl)benzoxazolium hydroxide:

5-(Pyrrol-1-yl)-2-methylbenzoxazole (2.0 g, 0.01 mol) was combined with 1,3-propanesultone (1.81 g, 0.015 mol) and 1.5 mL of valeronitrile and heated at 138° C. for 2 hrs. The solid formed was collected and washed with acetone and dried (3.0 g, 94% yield).

Anal. Calcd for $C_{15}H_{16}N_2SO_4$: C, 54.65; H, 5.16; N, 8.50. Found: C, 54.93; H, 4.81; N, 8.46.

Preparation of Anhydro-5-chloro-9-ethyl-5'-(pyrrol-1-yl)-3,3'-di(3-sulfopropyl)oxacarbocyanine hydroxide potassium salt (Dye I-1):

Anhydro-5-(pyrrol-1-yl)-2-methyl-3-(3-sulfopropyl)-benzoxazolium hydroxide (3.2 g, 10 mmol) was combined with anhydro-5-chloro-2-(2-ethoxybutenyl)-3-(3-sulfopropyl)benzoxazolium hydroxide (3.8 g, 10 mmol), 10 mL of m-cresol and triethylamine (5 mL) and heated at 95° C. for 30 min. The mixture was removed from the heat, chilled in an ice-bath, and diluted with ether. The orange oil that formed was dissolved in 400 mL of methanol and potassium acetate (5.0 g) was added. The product precipitated and was collected. The dye was purified by recrystallization from pyridine/water and then recrystallization from propionic acid, followed by recrystallization from acetic acid. This afforded 300 mg (4% yield) of dye; λ-max=501 nm (MeOH), ϵ-Max=14.3×10$^4$.

Anal Calcd for: $C_{29}H_{29}ClN_3O_8S_2K$-2.0 $H_2O$: C, 48.18; H, 4.57; N, 5.82. Found: C, 48.36; H, 4.14; N, 5.83.

Synthesis Example 2—Synthesis of Dye I-5

Intermediate C: 5-(Furan-2-yl)-2-methylbenzoxazole:

5-Amino-2-methylbenzoxazole (7.0 g, 0.05 mole), isopentyl nitrite (20 mL), and furan (230 mL) were combined and heated with stirring at 30° C. in a round-bottom flask equipped with a condenser. After heating for 48 hrs, the reaction mixture was removed from the heat, washed with water, and then evaporated to an oil. Distillation afforded the product ( 4.0 g, 43% yield), bp 130°–140° C. (0.6 mm). Recrystallization from ispropyl alchohol (14 mL) afforded 3.0 g of product (32% yield) mp 60° C.

Intermediate D; Anhydro-5-(furan-2-yl)-2-methyl-3-(3-sulfopropyl)benzoxazolium hydroxide:

5-(Furan-2-yl)-2-methylbenzoxazole (40.0 g, 0.2 mol) was combined with 1,3-propanesultone (25 g, 0.2 mole) and butyronitrile (100 mL) and heated at reflux for 18 hrs. The mixture was cooled to 25° C. and the product was collected and washed with butyronitrile and then ether. This afforded 55 g (86% yield) of D.

Preparation of Anhydro-5-chloro-9-ethyl-5'-(furan-2-yl)-3,3'-di(3-sulfopropyl)oxacarbocyanine hydroxide potassium salt (Dye I-5):

Anhydro-5-(furan-2-yl)-2-methyl-3-(3-sulfopropyl)-benzoxazolium hydroxide (3.2g, 10 mmol) was combined with anhydro-5-chloro-2 -(2-ethoxybutenyl)-3-(3-sulfopropyl)benzoxazolium hydroxide (4.0 g, 11 mmol), 20 mL of acetonitrile, and triethylamine (3 mL) and heated at reflux for 3 min. The mixture was cooled and then diluted with ether to give an orange oil. The ether was decanted; the oil was dissolved in pyridine (20 mL) and potassium acetate (1.0 g) in water (5 mL) was added. After heating to reflux, the mixture was cooled to 25° C. and the solid was collected. Recrystallization from pyridine/water, followed by a second recrystallization from acetic acid afforded the product (0.45 g, 7% yield), λ-max=503 nm (MeOH), ϵ-max=15.71×10$^4$.

Anal Calcd for: $C_{29}H_{28}ClN_2O_9S_2K$-2.0 $H_2O$: C, 48.16; H, 4.46; N, 3.87. Found: C, 47.93; H, 3.90; N, 3.81.

Photographic Evaluation Example 1: Black and white Photographic Materials.

Black and white photographic materials were prepared by coating a polyester support with a silver halide emulsion layer containing chemically-sensitized 0.2 μm cubic silver bromoiodide (2.6 mol % I) at 10.8 mg Ag/dm$^2$, hardened gelatin at 73 mg/dm$^2$, and sensitizing dye as identified in the Table III at 0.8 mole/mole Ag. The elements were given a wedge spectral exposure and processed in RP X-OMAT (a trademark) chemistry (a developer containing hydroquinone and p-methylaminophenol as developing agents).

The photographic speed of the dyes is reported (Table III) in terms of a sensitizing ratio (SR), which is defined as the speed at λ-max (in log E units multiplied by 100) minus the intrinsic speed of the dyed emulsion at 400 nm (in log E units multiplied by 100) plus 200. This measurement of speed allows for comparison while using a uniform chemical sensitization that is not optimized for each sensitizing dye.

Black and white stain was measured by processing unexposed film and placing the processed film in front of a scanning spectrophotometer. The total transmission was measured between 400 and 900 nm. This data was plotted as absorbance ($-\log 1/T$). The stain was calculated as the maximum absorbance at any wavelength in the range 400–900 nm (Table III).

Photographic Evaluation Example 2; Color Photographic Materials

Color photographic materials were prepared by coating a polyester support with a silver halide emulsion layer containing chemically-sensitized 0.7 μm (equivalent circular diameter) polymorphic silver bromoiodide (6 mole % I) at 16 mg Ag/dm², hardened gelatin at 63 mg/dm², 4-hydroxy-6-methyl-1,3,3a,7-tetraazaindene antifoggant at 5 mg/dm², N-[4-[2,4-bis(1,1-dimethylpropyl)phenoxy]butyl]-1-hydroxy-2-naphthalenecarboxamide coupler at 14 mg/dm², di-n-butylphthalate (8 mg/dm²) and sensitizing dye as identified in Table III at 0.4 mmole/mole Ag. The elements were given a wedge spectral exposure and coatings were processed in Kodak C-41 processing. The photographic speed of the dyes is reported in terms of a sensitizing ratio (SR) and λ-max was determined from absorptance measurements.

Color stain was obtained by processing unexposed color coatings for 3.5 minutes at 33° C. in the processing solution described below, followed by 1.5 minutes in a bleach-fix solution, and then a 3.5 minute wash. Stain was measured by placing the processed film in front of a scanning spectrophotometer. The stain was calculated as the maximum absorbance at any wavelength in the range 400–900 nm (Table IV).

| Processing Solution | |
|---|---|
| Benzyl alcohol | 14.2 mL |
| Potassium carbonate | 28 g |
| 45% Potassium sulfite | 2.75 mL |
| Triethanolamine | 11 mL |
| Hydroxylamine sulfate | 3.2 g |
| Potassium bromide | 0.58 g |
| Potassium chloride | 0.13 |
| Lithium chloride | 0.13 |
| Anticalcium agent | 0.8 mL |
| Water to make | 1.0 L |
| pH adjusted to | 10.08 |

All the dyes effectively sensitized the silver halide emulsions in which they were used. Comparison dyes are shown below.

TABLE II

Comparison Dye Structures.[2]

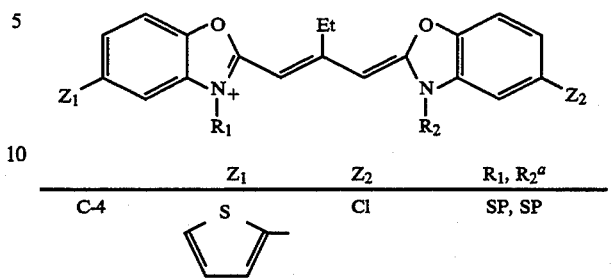

| | $Z_1$ | $Z_2$ | $R_1, R_2$[a] |
|---|---|---|---|
| C-1 | (phenyl fused) | Cl | 3SB, SP |
| C-2 | " | F | SP, SP |
| C-3 | " | $=Z_1$ | 3SB, 3SB |

TABLE II-continued

Comparison Dye Structures.[2]

| | $Z_1$ | $Z_2$ | $R_1, R_2$[a] |
|---|---|---|---|
| C-4 | (thienyl) | Cl | SP, SP |

[a]SP is 3-sulfopropyl, 3SB is 3-sulfobutyl.

TABLE III

Dye Speed in the B & W and Color Formats.

| | B & W Format | | Color Format | |
|---|---|---|---|---|
| Dye | λmax | SR | λmax | SR |
| C-1 | 547 | 250 | 540 | 225 |
| C-4 | | | 550 | 226 |
| I-1 | 550 | 255 | 550 | 238 |
| I-5 | 554 | 257 | 560 | 225 |
| C-2 | 538 | 235 | 543 | 208 |
| I-2 | 541 | 250 | 540 | 224 |
| I-7 | 546 | 248 | 550 | 221 |
| C-3 | 545 | 245 | | |
| I-8 | 559 | 253 | 560 | 240 |

TABLE IV

Dye Stain in the B & W and Color Formats

| | B & W Format | | | Color Format | |
|---|---|---|---|---|---|
| Dye | λmax | Stain OD $10^3$ | Dye | λmax | Stain OD $10^3$ |
| C-1 | 508 | 47 | C-1 | 510 | 42 |
| I-1 | 510 | 36 | C-4 | 512 | 38 |
| I-5 | 510 | 39 | I-1 | 510 | 22 |
| I-6 | 510 | 36 | I-5 | 512 | 35 |
| | | | | 560 | 19 |
| I-2 | 505 | 30 | | | |
| I-7 | 510 | 36 | C-2 | 515 | 34 |
| I-4 | 518 | 38 | I-2 | 510 | 13 |
| | | | I-7 | 510 | 15 |
| C-3 | 515 | 56 | C-3 | 512 | 46 |
| | 545 | 73 | | 550 | 105 |
| I-8 | 520 | 49 | I-8 | 550 | >100 |
| | 560 | 88 | | | |

Photographic Evaluation Example 3: High Silver Chloride, Color Paper Materials

The dyes (Table V) were coated at a level of $4.75 \times 10^{-4}$ moles/Ag mole on an aurous sulfide sensitized 0.31 μm silver chloride emulsion having the following coverages: silver (280 mg/m²), gelatin (829 mg/m²), 1-(3-acetamidophenyl)-5-mercaptotetrazole (380 mg/mole Ag), potassium bromide (700 mg/mole Ag), potassium chloride (7.9 g/mole Ag). The magenta coupler dispersion contained 1-(2,4,6-trichlorophenyl)-3-(2-chloro-5-(a-(4-hydroxy-3-tert-butylphenoxy)tetradecanoamide)anilino)-5-pyrazolone coupler (423 mg/m²), di-n-butyl phthalate (220 mg/m²) and gelatin (829 mg/m²).

The coupler dispersion was added to the dye/silver chloride emulsion immediately before coating. The elements also included a gelatin overcoat layer (1.08 g/m²) and a gelatin undercoat layer (3.23 g/m²). The layers were hardened with bis(vinylsulfonyl)methyl ether at 1.7% of the total gelatin weight.

To evaluate photographic sensitivity, the elements were exposed to a light source designed to simulate a color negative print exposure. The elements were then processed through a Colenta processor. This consists of a color development (45 sec, 35° C.), bleach-fix (45 sec, 35° C.) and stabilization or water wash (90 sec, 35° C.) followed by drying (60 sec, 60° C.). Processing solutions are described below. The speeds at 1.0 density units above Dmin are listed in Table V.

| Color Developer | |
|---|---|
| Lithium salt of sulfonated polystyrene (30% by weight) | 0.25 mL |
| Triethanolamine | 11.0 mL |
| N,N-diethylhydroxylamine (85% by wt) | 6.0 mL |
| Potassium sulfite (45% by wt) | 0.5 mL |
| Color developing agent 4 (N-ethyl,N-2-methanesulfonylaminoethyl)-2-methyl phenylenediaminesesquisulfate monhydrate | 5.0 g |
| Kodak Ektaprint 2 Stain Reducing Agent (a stilbene material commercially available from Eastman Kodak Co. | 2.3 g |
| Lithium sulfate | 2.7 g |
| Potassium chloride | 2.5 g |
| Potassium bromide | 0.025 g |
| Kodak Anti Cal No (an organic phosphorous acid material commercially available from Eastman Kodak Co.) | 0.8 mL |
| Potassium carbonate | 25.0 g |
| Water to total 1 liter, pH adjust to | 10.12 |
| Bleach-fix | |
| Ammonium thiosulfate | 58.0 g |
| Sodium sulfite | 8.7 g |
| Ethylenediaminetetraacetic acid ferric ammonium salt | 40.0 g |
| Acetic acid | 9.0 mL |
| Water to total 1 Liter, pH adjusted to | 6.2 |
| Stabilizer | |
| Sodium citrate | 1.0 g |
| Dearside (a biocide produced by Rohm and Haas) | 45.0 ppm |
| Water to total 1 liter, pH adjusted to | 7.2 |

For retained dye stain evaluation, identical but unexposed elements prepared as described above were subjected to the processing described below at 35° C. Optical density in the range 400–700 nm of the processed coatings was measured by reflectance spectroscopy.

| Process: | |
|---|---|
| 40 sec in developer | |
| 5 sec drain | |
| 45 sec Kodak Ektaprint ® blix | |
| 3 min wash | |
| dry | |
| Developer composition: | |
| p-Phenylenediamine developing agent | 5.0 g |
| Sulfonated polystyrene | 0.25 mL |
| Triethanolamine | 11.0 mL |
| Diethylhydroxylamine (85%) | 6.0 mL |
| Lithium sulfate | 2.7 g |
| Anti-calcium agent | 0.8 mL |
| Potassium chloride | 1.6 g |
| Potassium bromide | 10.0 mg |
| Potassium carbonate | 25.0 g |
| Water to make | 1.0 L |
| Adjust pH to | 10.0 |

TABLE V

| Dye Speed and Stain in the Silver Chloride Paper Format | | | | |
|---|---|---|---|---|
| | | | Stain | |
| Dye | λmax | Speed | λmax | OD × 10³ |
| I-1 | 550 | 173 | 516 | 04 |
| I-2 | 541 | 166 | — | 0 |
| I-5 | 549 | 191 | 512 | 10 |
| I-6 | 544 | 181 | — | 0 |
| C-1 | 550 | 185 | 509 | 28 |

The data presented in Tables III–V indicate that the dyes used according to the invention provided effective sensitization and gave significantly lower post-processing stain than the comparison dyes, particularly in the color format.

The invention has been described in detail with particular reference to preferred embodiments thereof, but it will be understood that variations and modifications can be effected within the spirit and scope of the invention.

What is claimed is:

1. A silver halide photographic element comprising an emulsion of light sensitive silver halide containing a sensitizing dye having the formula:

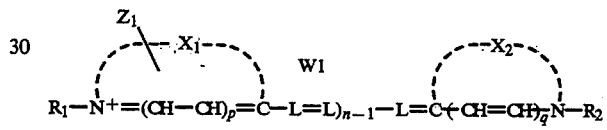

$X_1$ and $X_2$ each independently represent the atoms necessary to complete a 5- or 6-membered heterocyclic nucleus, and $X_1$ may be further substituted and $X_2$ is substituted or unsubstituted;

n is a positive integer from 1 to 4, p and q each independently represents 0 or 1, each L independently represents a substituted or unsubstituted methine group, $R_1$ and $R_2$ each independently represents substituted or unsubstituted aryl or substituted or unsubstituted alkyl, $Z_1$ represents a substituted or unsubstituted pyrrole containing group;

W1 is a counterion as needed to balance the charge of the molecule.

2. A silver halide photographic element according to claim 1 wherein any substituents other than $Z_1$ are non-aromatic.

3. A silver halide photographic element according to claim 1 additionally comprising a water-immiscible dispersion.

4. A silver halide photographic element according to claim 1 wherein the silver halide emulsion is a tabular grain emulsion wherein at least 50% of the grain population is accounted for by tabular grains that have a thickness of less than 0.5 μm and which satisfy the formula $ECD/t^2 > 25$, wherein ECD represents the average equivalent circular diameter of the tabular grains in micrometers, and t represents the average thickness of the grains in micrometers.

5. A silver halide photographic element according to claim 1, wherein the dye has the formula:

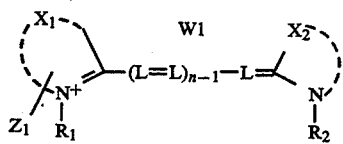

$X_1$ and $X_2$ independently represent the atoms necessary to complete a benzothiazole nucleus, benzoxazole nucleus, benzoselenazole nucleus, benzotellurazole nucleus, quinoline nucleus or benzimidazole nucleus, and $X_1$ may be further substituted and $X_2$ substituted or unsubstituted; and $Z_1$ is a substituted or unsubstituted pyrrole directly appended to the benzene ring of $X_1$.

6. A silver halide photographic element comprising an emulsion of light sensitive silver halide containing a sensitizing dye having the formula:

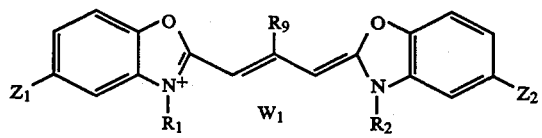

wherein: $Z_1$ represents a pyrrole or furan ring the benzene rings are unsubstituted except by $Z_1$ and $Z_2$, and the pyrrole or furan ring of $Z_1$ is directly appended to the benzene ring; $R_1$ and $R_2$ represent lower alkyl at least one of which is substituted with an acid or acid salt group; $R_9$ is a lower alkyl; $Z_2$ is H, substituted or unsubstituted lower alkyl, substituted or unsubstituted alkenyl, halogen, or alkoxy; $W_1$ is a counterion as needed to balance the charge of the molecule; the photographic material additionally comprising a water-immiscible dispersion.

7. A silver halide photographic element according to claim 6 wherein $Z_1$ is any one of:

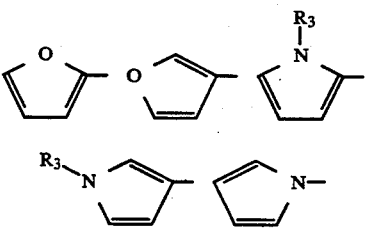

where $R_3$ is hydrogen, substituted or unsubstituted alkyl, or substituted or unsubstituted aryl.

8. A silver halide photographic element according to claim 7 where $R_3$ is hydrogen or a substituted or unsubstituted lower alkyl.

9. A silver halide photographic element according to claim 6 wherein both $R_1$ and $R_2$ are substituted with an acid or acid salt group.

10. A photographic element according to claim 6 wherein $R_1$ and $R_2$ are both substituted with an acid or acid salt group and have from 1 to 4 carbon atoms, and wherein $R_9$ is methyl or ethyl.

11. A silver halide photographic element according to claim 6 wherein the dye is coated at a level of about $5 \times 10^{-4}$ moles per mole of silver of the silver halide.

12. A silver halide photographic element comprising an emulsion of a light sensitive silver halide containing a sensitizing dye having the formula:

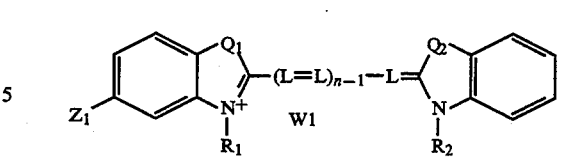

wherein:

n is a positive integer from 1 to 4, each L independently represents a substituted or unsubstituted methine group, and the benzene ring of each nucleus may be further substituted or unsubstituted;

$Q_1$ and $Q_2$ are, independently, O, N or S;

$R_1$ and $R_2$ each independently represents substituted or unsubstituted aryl or substituted or unsubstituted alkyl;

$Z_1$ represents a substituted or unsubstituted pyrrole containing group;

$W_1$ is a counterion as needed to balance the charge of the molecule.

13. A silver halide photographic element according to claim 12 additionally comprising a water-immiscible dispersion carrying a color coupler.

14. A photographic element according to claim 12, wherein the silver halide emulsion comprises at least 95 mole percent silver chloride.

15. A silver halide photographic element according to claim 12, wherein one of $R_1$ and $R_2$ is substituted with an acid or acid salt group.

16. A silver halide photographic element according to claim 12 wherein any substituents on the dye, other than, $Z_1$ are non-aromatic.

17. A silver halide photographic element comprising an emulsion of light sensitive silver halide containing a sensitizing dye having the formula:

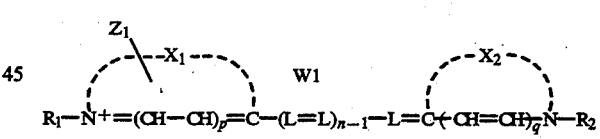

$X_1$ and $X_2$ each independently represent the atoms necessary to complete a 5- or 6-membered heterocyclic nucleus, and $X_1$ may be further substituted and $X_2$ is substituted or unsubstituted;

n is a positive integer from 1 to 4, p and q each independently represents 0 or 1, each L independently represents a substituted or unsubstituted methine group, $R_1$ and $R_2$ each independently represents substituted or unsubstituted alkyl, $Z_1$ represents a substituted or unsubstituted furan, the furan ring being directly appended to $X_1$;

$W_1$ is a counterion as needed to balance the charge of the molecule;

and wherein any substituents other than $Z_1$ are non-aromatic.

18. A silver halide photographic element according to claim 17, wherein the dye has the formula:

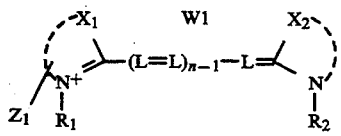

$X_1$ and $X_2$ independently represent the atoms necessary to complete a benzothiazole nucleus, benzoxazole nucleus, benzoselenazole nucleus, benzotellurazole nucleus, quinoline nucleus or benzimidazole nucleus, and $X_1$ may be further substituted and $X_2$ substituted or unsubstituted; and $Z_1$ is a substituted or unsubstituted furan, the furan ring being directly appended to the benzene ring of $X_1$.

19. A silver halide photographic element according to claim 17 additionally comprising a water immiscible dispersion.

20. A silver halide photographic element according to claim 17 wherein the silver halide emulsion is a tabular grain emulsion wherein at least 50% of the grain population is accounted for by tabular grains that have a thickness of less than 0.5 μm and which satisfy the formula $ECD/t^2 > 25$, wherein ECD represents the average equivalent circular diameter of the tabular grains in micrometers, and t represents the average thickness of the grains in micrometers.

21. A silver halide photographic element comprising an emulsion of a light sensitive silver halide containing a sensitizing dye having the formula:

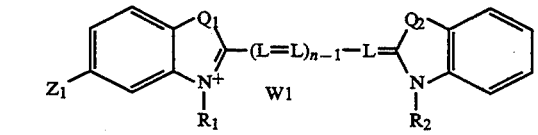

wherein:

n is a positive integer from 1 to 4, each L independently represents a substituted or unsubstituted methine group, and the benzene ring of each nucleus may be further substituted or unsubstituted;

$Q_1$ and $Q_2$ are, independently, O, N or S;

$R_1$ and $R_2$ each independently represents substituted or unsubstituted alkyl;

$Z_1$ represents a substituted or unsubstituted furan, the furan ring being directly appended to the benzene ring shown;

W1 is a counterion as needed to balance the charge of the molecule;

and wherein any substituents other than $Z_1$ are non-aromatic.

22. A silver halide photographic element according to claim 21 additionally comprising a water-immiscible dispersion carrying a color coupler.

23. A silver halide photographic element according to claim 21 wherein the silver halide emulsion comprises at least 95 mole percent silver chloride.

24. A silver halide photographic element according to claim 21 wherein one of $R_1$ and $R_2$ is substituted with an acid or acid salt group.

* * * * *